United States Patent
Linde

(10) Patent No.: US 10,826,104 B2
(45) Date of Patent: Nov. 3, 2020

(54) METHOD FOR TAILORING AND INTEGRATING A FUEL CELL UNIT INTO A VEHICLE

(71) Applicant: Airbus Operations GmbH, Hamburg (DE)

(72) Inventor: Peter Linde, Hamburg (DE)

(73) Assignee: Airbus Operations GmbH (DE)

( * ) Notice: Subject to any disclaimer, the term of this patent is extended or adjusted under 35 U.S.C. 154(b) by 519 days.

(21) Appl. No.: 15/827,248

(22) Filed: Nov. 30, 2017

(65) Prior Publication Data
US 2018/0166734 A1    Jun. 14, 2018

(30) Foreign Application Priority Data
Dec. 14, 2016 (EP) .................................. 16204012

(51) Int. Cl.
*H01M 8/2484* (2016.01)
*B64D 41/00* (2006.01)
(Continued)

(52) U.S. Cl.
CPC ......... *H01M 8/2484* (2016.02); *B22F 3/1055* (2013.01); *B22F 5/10* (2013.01);
(Continued)

(58) Field of Classification Search
CPC ....... B64D 2041/005; B64D 2027/026; H01M 8/2475; H01M 8/2483; B60K 15/00;
(Continued)

(56) References Cited

U.S. PATENT DOCUMENTS 8,771,853 B2 *  7/2014  Ogawa ................ H01M 8/2457
429/452
9,539,897 B2 *  1/2017  Yoshinaga ........... B60K 15/067
(Continued)

FOREIGN PATENT DOCUMENTS

EP    2443035 A2    4/2012
EP    2766947 A1    8/2014
(Continued)

OTHER PUBLICATIONS

Search report from European Application No. 16204012.5, dated Jun. 16, 2017.

*Primary Examiner* — Magdalena Topolski
(74) *Attorney, Agent, or Firm* — Lerner, David, Littenberg, Krumholz & Mentlik, LLP

(57) ABSTRACT

A method for integrating a fuel cell unit into a vehicle structural component, includes determining an available receiving space in an interior structural component of the vehicle, providing two casing parts assembleable to a closed casing, providing a fuel cell having an anode, a cathode and an electrolyte, assembling the casing parts and the fuel cell to form the fuel cell unit, and inserting the fuel cell unit into the receiving space. A casing part is additively manufactured such that the fuel cell unit precisely fits into the receiving space. A casing part includes an exterior fuel inlet and an interior fuel distributor for leading a fuel from the inlet to a fuel outlet couplable with the fuel cell. A casing part includes an exterior oxidant inlet and an interior oxidant distributor for leading an oxidant from the inlet to an oxidant outlet couplable with the fuel cell.

11 Claims, 2 Drawing Sheets

(51) Int. Cl.
*H01M 8/2475* (2016.01)
*H01M 8/2483* (2016.01)
*B33Y 80/00* (2015.01)
*H01M 8/04082* (2016.01)
*B64C 1/06* (2006.01)
*H01M 8/2404* (2016.01)
*B22F 3/105* (2006.01)
*B22F 5/10* (2006.01)
*B22F 7/08* (2006.01)
*B22F 7/06* (2006.01)
*B29C 64/153* (2017.01)
*B33Y 10/00* (2015.01)

(52) U.S. Cl.
CPC ............. *B22F 7/062* (2013.01); *B22F 7/08* (2013.01); *B33Y 80/00* (2014.12); *B64C 1/061* (2013.01); *B64C 1/068* (2013.01); *B64D 41/00* (2013.01); *H01M 8/04201* (2013.01); *H01M 8/2404* (2016.02); *H01M 8/2475* (2013.01); *H01M 8/2483* (2016.02); *B29C 64/153* (2017.08); *B33Y 10/00* (2014.12); *B64D 2041/005* (2013.01); *H01M 2250/20* (2013.01); *Y02P 70/50* (2015.11); *Y02T 90/40* (2013.01)

(58) Field of Classification Search
CPC ....... B60K 15/01; B60K 15/013; B60L 50/70; B60L 50/71; B60L 50/72
See application file for complete search history.

(56) References Cited

U.S. PATENT DOCUMENTS

| | | | | |
|---|---|---|---|---|
| 2004/0076867 | A1* | 4/2004 | Day | H01M 8/0228 |
| | | | | 429/481 |
| 2004/0160052 | A1* | 8/2004 | Marsala | B60K 15/01 |
| | | | | 280/834 |
| 2007/0090786 | A1 | 4/2007 | McLean | |
| 2008/0070089 | A1* | 3/2008 | Nomura | H01M 8/2475 |
| | | | | 220/592.21 |
| 2009/0311571 | A1* | 12/2009 | Takahashi | H01M 8/242 |
| | | | | 429/434 |
| 2012/0068008 | A1 | 3/2012 | Buchheit | |
| 2014/0234744 | A1 | 8/2014 | Nielsen et al. | |
| 2015/0280268 | A1* | 10/2015 | Naito | H01M 8/2475 |
| | | | | 429/469 |

FOREIGN PATENT DOCUMENTS

| | | |
|---|---|---|
| GB | 2537935 A | 11/2016 |
| WO | 2014021970 A2 | 2/2014 |

* cited by examiner

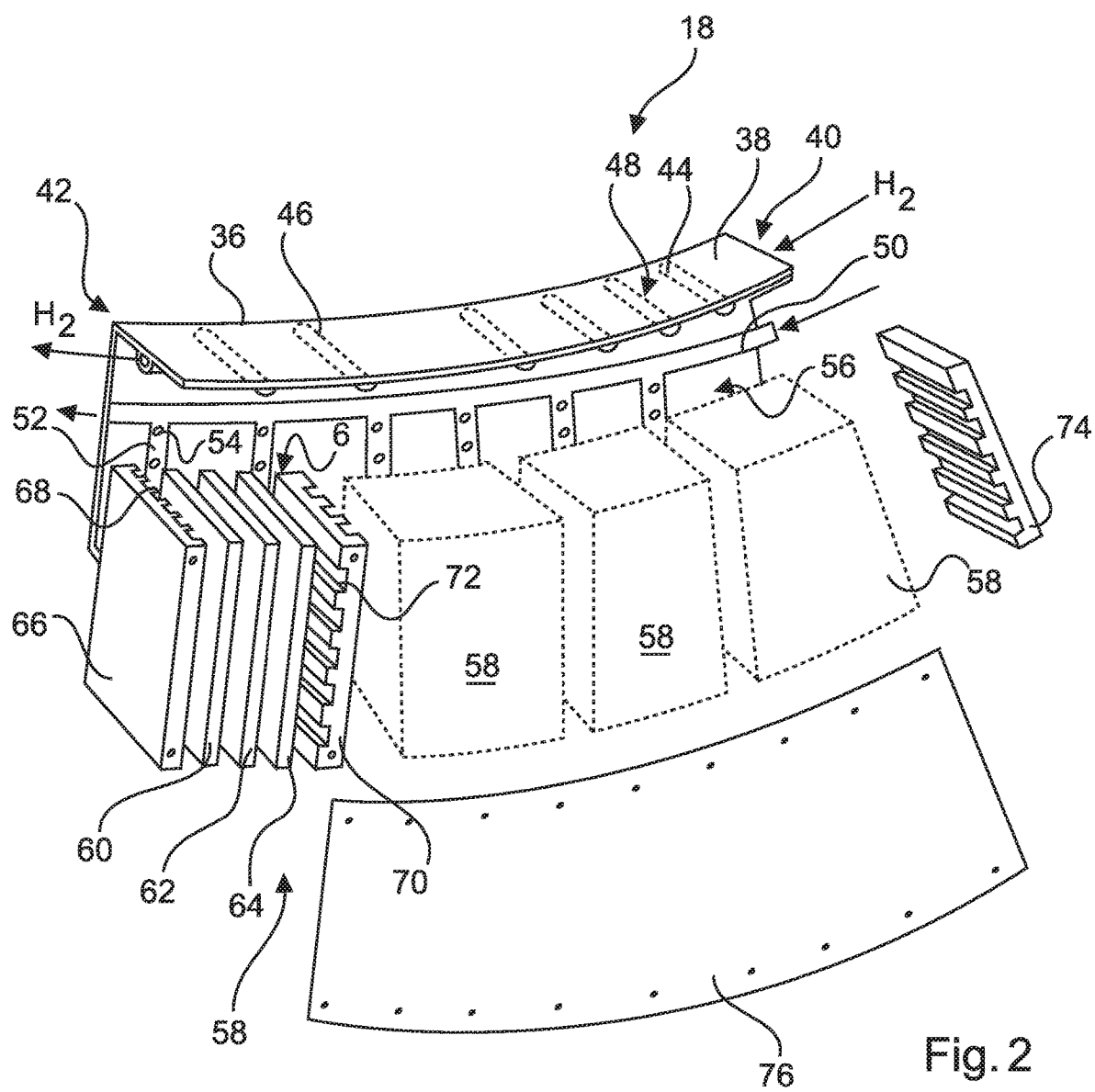
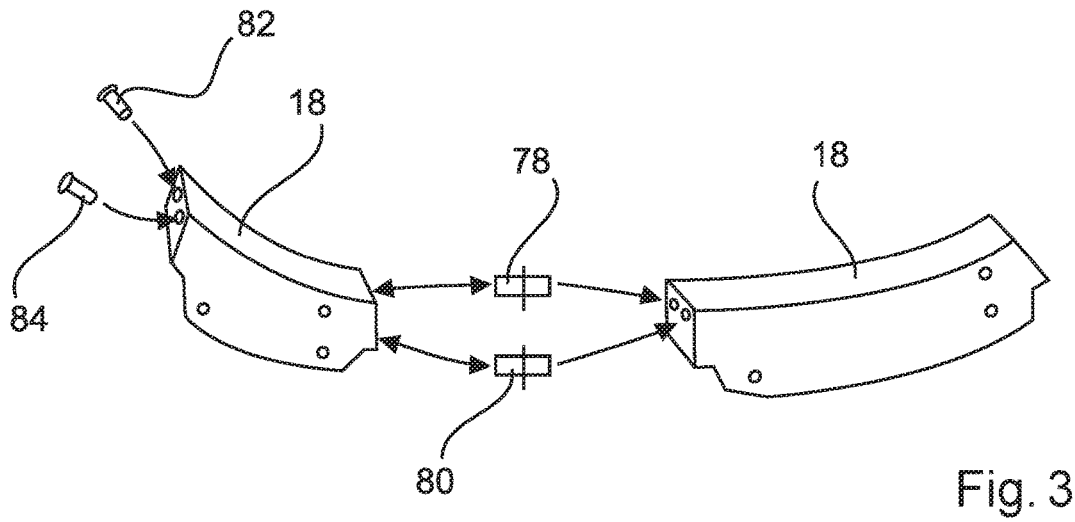

METHOD FOR TAILORING AND INTEGRATING A FUEL CELL UNIT INTO A VEHICLE

FIELD OF THE INVENTION

The invention relates to a method for integrating a fuel cell unit into a vehicle, a fuel cell system for integration into a vehicle as well as an aircraft comprising such a fuel cell system.

BACKGROUND OF THE INVENTION

Fuel cells for providing electrical energy based on a reaction of hydrogen and oxygen particularly in mobile applications are known for many decades. Various concepts for integrating fuel cells into large commercial aircraft exist. Concepts exist that are directed to replacing a common auxiliary power unit by a fuel cell, which also includes the common installation space in a tail section of a fuselage. For example, this is known from EP 1 817 231 B1.

Further concepts are known, which are based on the installation of relatively small individual fuel cell units for a more local generation of electrical energy at different places in an aircraft. For example, EP 3 012 189 A1 shows the integration of fuel cell units in a galley installed in an aircraft cabin.

The installation of a fuel cell system for generating electrical energy in an aircraft requires dedicated installation spaces. Given a tendency to increase the efficiency of use of an interior space in the aircraft, while at the same time to further increase a passenger comfort, dedicated installation spaces for fuel cells for a local generation of electrical power are hard to provide.

BRIEF SUMMARY OF THE INVENTION

An aspect of the invention may meet the need for local installation spaces for integrating a fuel cell without hindering the efficiency for using the interior space in a vehicle cabin or the such.

A method for integrating a fuel cell unit into a structural component of a vehicle is proposed, the method comprising the steps of determining an available receiving space in an interior structural component of the vehicle, that allows receiving a fuel cell unit through insertion from outside the structural component into the receiving space, providing at least two casing parts that are assembleable to a closed casing, providing at least one fuel cell having an anode, a cathode and an electrolyte, assembling the casing parts and the at least one fuel cell to form the fuel cell unit, and inserting the fuel cell unit into the receiving space of the structural component. At least one of the casing parts is manufactured using an additive manufacturing method such that the fuel cell unit precisely fits into the determined receiving space. One of the casing parts comprises an exterior fuel inlet and an interior fuel distributor for leading fuel from the exterior fuel inlet to at least one fuel outlet couplable with each of the at least one fuel cell. One of the casing parts comprises an exterior oxidant inlet and an interior oxidant distributor for leading an oxidant from the exterior oxidant inlet to at least one oxidant outlet couplable with each of the at least one fuel cell.

A first core aspect of the invention therefore lies in providing a compact fuel cell unit that is integratable into an already present structural component of a vehicle that has a commonly unused space for accommodating objects. A vehicle usually comprises a vehicle body, which is adapted for receiving passengers. The vehicle body often comprises an outer skin or hull, which surrounds the receiving space for passengers. The skin or hull is often attached to or comprises a certain stiffening structure that allows to maintain a desired shape of the vehicle body throughout the operation of the vehicle. The design of such a stiffening structure depends on the size, the purpose of the vehicle, the intended travelling velocities, expected accelerations and other parameters. A common design principle for larger vehicles is based on a combination of longitudinal stiffening elements and circumferential stiffening elements. In the case of an aircraft, the vehicle body in form of a fuselage may comprise a series of circumferential frame elements distributed at a distance to each other along a longitudinal axis of the fuselage. Further, often a series of longitudinal stiffening elements ("stringers") with a plurality of stringers arranged along a circumferential course at a distance to each other and parallel to the longitudinal axis is used.

The frame elements often comprise a cross-sectional profile created by a set of flanges, which are curved to assume the respective local circumferential shape of the fuselage at the installation location of the frame element, wherein the flanges are mechanically connected by means of at least one web at a distance to each other. As an example, without limiting the core of the invention, the cross-section of such a frame element may be of an I-shape or a double-T-shape.

While some frame elements particularly in the case of an aircraft may comprise thermal insulation material wrapped around them, there may some frame elements exist that are integrated in a plain manner. All of these may comprise a certain section, which encloses a certain volume, in which no other installation is present. For example, there may exist a certain volume enclosed by two opposite flanges and delimited by a web therebetween, which is completely empty. Such a volume may be regarded as a receiving space for integrating a device from outside the structural component without further preparing steps.

By the manufacturing of a compact fuel cell unit with dimensions adapted to the respective receiving space it is possible to provide at least one, but preferably a multitude of local power sources within the vehicle.

The method according to an aspect of the invention may therefore start with the step of determining the available receiving space in an interior structural component of the vehicle. This may include measuring or retrieving the geometric parameters of the respective structural component which is intended to be equipped with a precisely fitted fuel cell unit. In this context it is stated that the dimensioning criteria refer to an unobstructed opening contour of the respective structural component, with which internal recesses, undercuts or other volume features are neglected that are only accessible from inside the structural component. It should be clear that the receiving space is to be considered a space that is accessible through inserting the fuel cell unit through an opening contour.

Providing the casing parts may include an additive manufacturing method, which is also known as generative manufacturing method. Such a manufacturing method may comprise the subsequent local accumulation of particles from a selected material in a predetermined region in fine layers and hardening or curing of the respective layer. This generative manufacturing method may preferably be applied in the form of an ALM or SLM method. The materials characteristics of the manufactured product are equal or superior to a cast component. For hardening or curing in particular a laser is suitable as a heat source, and consequently as a special form of an ALM method an SLM method ("Selective Laser Melting") may be applied. It is advantageous in the method according to an aspect of the invention to use powdery steel, stainless steel, aluminum alloys, titanium alloys or other meltable materials. For certain application fields the use of cobalt alloys and nickel alloys is also advantageous. For application in vehicles, and in particular in commercial aircraft, in particular powdery AlSi1OMg or TiA16V4 is suitable. Further, since the fuel cell unit is not necessarily a load carrying component, also plastic materials may be used. The layer thicknesses realized in the method may depend on several factors such as, among other things, the output of the heat source used, the required accuracy, the materials characteristics and the reworkability. The smallest possible base area of a layer section depends on the geometric extension of the heat source. Thus, with particularly fine heat sources, for example a laser beam, a particularly fine structure may be manufactured. By matching the respective contour to be melted on, the process may be repeated until the desired casing part has been completed.

The extent of the additive manufacturing depends on the shape and size of the respective structural component as well as of the required power output and hence the size of the fuel cell unit. If a rather complicated receiving space is present, it may be worthwhile to increase the extent of additive manufacturing, such that the fuel cell unit snugly fits into the receiving space without a labor intensive production method.

The casing parts altogether have to be assembleable to constitute a closed casing with all necessary ports. Assembling the casing parts as well as the at least one fuel cell leads to the creation of a compact fuel cell unit, which is then insertable into the receiving space of the structural component.

During the manufacturing of the respective casing parts, an integrated fuel distributor should be added, which is particularly required if a plurality of fuel cells is to be installed into the casing. The fuel distributor serves for receiving a fuel cell fuel from outside the fuel cell unit and for distributing it throughout the individual fuel cells. Further details and options of the fuel distributor are explained later on.

In analogy to this, a casing part comprises an integrated oxidant distributor for leading an oxidant from an oxidant inlet to the at least one fuel cell. This is particularly required for a plurality of fuel cells integrated into the casing. Again, further details are explained later on.

Altogether, the method allows to integrate fuel cells in a vehicle at a plurality of different locations in order to provide local generation of electrical power without having to allocate space in the cabin or other regions of the vehicle, but to use previously unused space in a structural component. By using previously unused space through occupation by fuel cell units, the efficiency of the use of space inside the vehicle is increased. At the same time, the amount of cabling for providing electrical energy to consumers inside the vehicle may be reduced, since local power generating fuel cells are simple to integrate.

In an advantageous embodiment, the method further comprises providing at least a component of the at least one fuel cell through an additive manufacturing method. The individual receiving space for integration of a fuel cell unit depends on the region in the vehicle, which is to be equipped with fuel cell units. While some regions may provide regular geometrical structures, some may provide more complex shaped receiving spaces. As the shape of the at least one fuel cell unit needs to conform the receiving space it is clear that inside the at least one fuel cell unit also a more or less complex installation space is provided, which is used for holding the at least one fuel cell. The anode, the cathode and other core components of the at least one fuel cell may therefore be manufactured through an additive method, which leads to an optimum adaption of the at least one fuel cell.

In another advantageous embodiment, providing at least one of the casing parts through using an additive manufacturing method includes integrating the at least one fuel duct having an external fuel input and at least one internal fuel output inside a walling of the respective casing part. The external fuel output may be created through providing an opening in an exterior side of the respective casing part, into which a suitable connection piece may be attached. The external side may be a side on a larger surface between delimiting edges or it may be provided directly into an edge surface of the respective casing part.

In a still further embodiment, providing at least one of the casing parts through using an additive manufacturing method includes integrating the oxidant distributor through at least one oxidant line with an exterior oxidant input and at least one interior oxidant output into a walling of the respective casing part. Depending on the number of fuel cells integrated into the casing, the number of internal oxidant outlets may be chosen.

In this regard it may be feasible to provide the respective additively manufactured casing part with a certain ridge or border, into which the fuel inlet and/or the oxidant inlet is integrated. This allows to place the fuel inlet and/or the oxidant inlet into a distance to a contact surface of the fuel cell unit.

The method may further comprise inserting at least a second fuel cell unit into a respective at least one second receiving space of the structural component. Depending on the available receiving space or spaces it may not be possible to integrate a larger fuel cell unit that delivers the required electrical power alone, but it may be feasible to provide a plurality of individual fuel cell units in the same structural component. Hence, a plurality of independent fuel cell units may be used for generating electrical power and the voltage level of a combination of a plurality of fuel cells may be increased through a suitable electrical connection.

Preferably, the method according to an aspect of the invention comprises electrically connecting at least two of the fuel cell units in a serial connection. This increases the total voltage delivered by a plurality of fuel cell units.

In case a plurality of fuel cell units is used, the method may also comprise connecting the external fuel inlet of one of the fuel cell units to an external fuel outlet of another one of the fuel cell units, which fuel outlet is coupled with the fuel duct of the respective one of the fuel cell units.

In analogy to this, the method may further comprise connecting the external oxidant inlet of one of the fuel cell units to an external oxidant outlet of another one of the fuel cell units, which oxidant outlet is coupled with the oxidant duct of the respective one of the fuel cell units.

If a plurality of fuel cell units is used, which are identical or at least very similar it may be advantageous to provide a plug to close an unused fuel and/or oxidant outlet.

Still further, the method may comprise providing a coolant feed line and a coolant return line to a coolant inlet and a coolant outlet of the at least one fuel cell unit. The coolant may be provided by means of a coolant circuit having a coolant pump, a reservoir and at least one heat exchanger for dissipating heat. The heat exchanger may be arranged in a region of the vehicle that has a constant demand for heat or in a region where a constant flow of heat is absorbable reliably. As an advantageous improvement, the coolant circuit may comprise a plurality of heat exchangers, which are connected to bypass lines through a series of valves, such that each heat exchanger may selectively be bringable in a fluid communication with the coolant circuit or may selectively be deactivatable. For example, if heat consuming devices in a kitchen are to be operated, one of the plurality of heat exchangers may deliver this heat. Further, in case the vehicle is an aircraft, a skin heat exchanger may be used at cruise altitudes in which the ambient temperature is particularly low and suitable for dissipating heat into the environment of the aircraft. For transferring the heat created in the fuel cell units, these may be equipped with components having certain coolant conduits in heat generating components and/or in at least one of the casing parts, which coolant conduits lead fresh and cold coolant into the respective component and transfer heat into the coolant, which then exits the respective fuel cell unit.

Further, the method may also comprise coupling water extraction outlets of the fuel cell units with a water extraction duct. For this purpose, the water extraction duct may be installed in the vehicle and be coupled with a water receiving device. This may be a device that simply stores in the interior of the vehicle or dissipates it to the surrounding of the aircraft. As an alternative, water consuming devices, such as a galley or a lavatory, may be provided with the extracted water. In the latter case, the installation space of the at least one fuel cell unit may be chosen to be as near as possible to the respective water consuming devices.

The invention also relates to a fuel cell system for integration into a structural component of a vehicle, the system having at least one fuel cell unit comprising at least one fuel cell having an anode, a cathode and an electrolyte; a closed fuel cell unit casing having at least two casing parts; wherein one of the casing parts comprises an exterior fuel inlet and an interior fuel distributor for leading a fuel from the exterior fuel inlet to at least one fuel outlet couplable with each of the at least one fuel cell, and wherein one of the casing parts comprises an exterior oxidant inlet and an interior oxidant distributor for leading an oxidant from the exterior oxidant inlet to at least one oxidant outlet couplable with each of the at least one fuel cell, and wherein at least one of the casing parts is manufactured using an additive manufacturing method such that the fuel cell unit precisely fits into a receiving space of a structural component of a vehicle.

In an advantageous embodiment, the system comprises a plurality of fuel cell units, wherein at least a subset of the plurality of the fuel cell units has at least one of a fuel outlet connected to the fuel inlet of the respective fuel cell unit and an oxidant outlet connected to the oxidant inlet of the respective fuel cell unit, wherein the at least one of the fuel outlet and the oxidant outlet is connected to a respective one of a fuel inlet and an oxidant inlet of another fuel cell unit.

In a still further embodiment, the shape of the fuel cell unit is curved so as to fit into a curved circumferential frame element having at least one flange that is attached to a web preferably, but not exclusively, in a right angle. Such a frame element may be integrated as a circumferential frame element in an aircraft fuselage, wherein the receiving space may have a C-shaped cross-sectional profile.

Still further, the fuel cell unit may comprise at least one lateral recess or cut-out, which is adapted to fit onto a longitudinal stiffening part that intersects with an outer flange and the web of the circumferential frame element. As stated above, exemplarily an aircraft often comprises circumferential frames as well as longitudinal stringers, which commonly intersect with each other, such that the outer flange of the frame element and the web comprise openings, through which the longitudinal stiffening parts extend. Hence, a fuel cell unit may be designed so as to fit into an available receiving space that is at one side delimited by the longitudinal stiffening element, onto which the at least one recess or cut-out snugly fits.

Attaching the at least one fuel cell unit may be conducted through a clip-on-connection. By using a clip-on-connection it is simple to replace a fuel cell unit in case of a malfunction or if the power demands are changed. The structural component of the vehicle does not need to be modified or equipped with fasteners, such that they may remain completely unchanged. However, such a clip-on-connection should be stable enough to always ensure maintaining a position of the fuel cell unit under any possible operation condition of the vehicle. In case of the installation in an aircraft, a landing shock, the occurrence of turbulences and the expected accelerations in all spatial directions under consideration of regulated safety factors have to be taken into account.

In an alternative embodiment, the attaching may be realized through the use of screws or bolts. Hence, a reliable and extremely stable mechanical connection between the fuel cell unit and the respective structural component can be created. This, however, requires a modification of the structural component. As a side effect, this leads to a combination of at least a section of the respective structural component and the fuel cell unit to form an integral component with a required load carrying capability. This means, that on the one hand, the fuel cell unit supports the respective structural component in absorbing certain loads that occur during a normal operation of the vehicle. On the other hand, the structural component may support the mechanical properties of the casing of the fuel cell. Altogether, the thickness of the casing or of the respective structural component in the region of the receiving space may be reduced. This consequently reduces the total weight introduced by the fuel cell unit to a value that would be below the weight of a fuel cell device that is arranged in another region of the vehicle.

The invention further relates to an aircraft, comprising a fuselage having a series of frame elements arranged at a distance to each other and at least one fuel cell system according to the above description. At least one frame element of the series of frames comprises a first flange and a web connected to the first flange, wherein at least one fuel cell unit of the at least one fuel cell system is arranged in a profile space defined by the first flange and the web.

In another advantageous embodiment, the at least one frame element comprises a second flange connected to the web, wherein the profile space for integration of the at least one fuel cell is defined between the first flange, the second flange and the web.

Still further, a plurality of fuel cell units may be arranged in at least one frame element of the series of frames, wherein the plurality of fuel cell units is electrically connected to each other in a series connection.

As stated further above, the external fuel inlet of one of the fuel cell units may also be connected to an external fuel outlet of another one of the fuel cell units, which fuel outlet is coupled with the fuel duct of the respective one of the fuel cell units.

In analogy to this, the external oxidant inlet of one of the fuel cell units may be connected to an external oxidant outlet of another one of the fuel cell units, which oxidant outlet is coupled with the oxidant duct of the respective one of the fuel cell units.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 2 shows a principle setup of a fuel cell unit.

FIG. 3 shows a connection of two adjacent fuel cell units.

DETAILED DESCRIPTION

Figure 1:
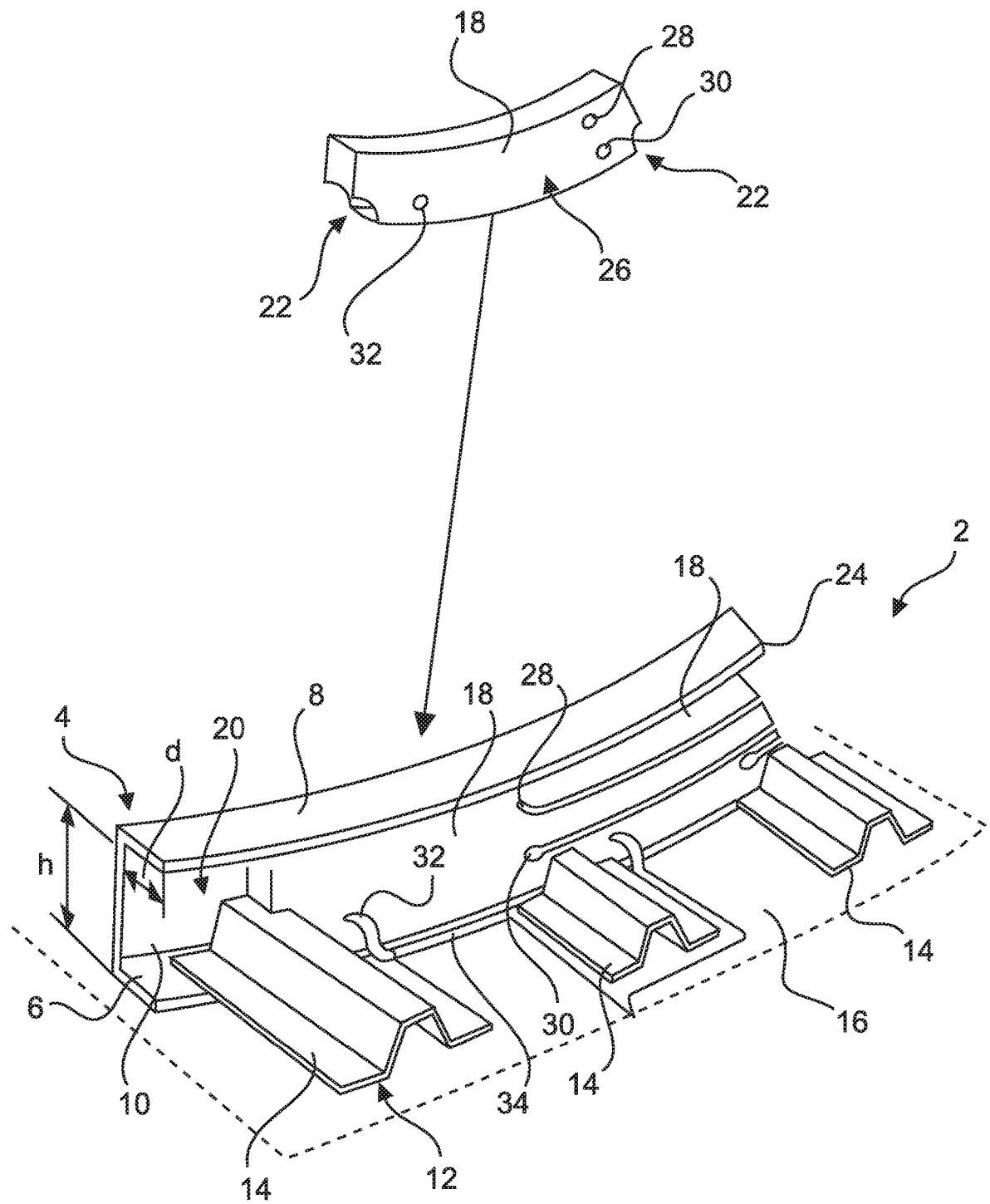
FIG. 1 shows a part of a fuselage structure of an aircraft with an integrated fuel cell unit.

FIG. 1 shows a part of a fuselage structure 2 of an aircraft. A circumferential frame element 4 is illustrated, which has an outer flange 6, an inner flange 8 as well as a web 10 extending therebetween, which connects both flanges 6 and 8 to form a C-like cross-sectional profile. The outer flange 6 is at a radial outermost position, which the inner flange 8 is at a radial inward location.

Longitudinal stiffening elements in the form of stringers 12 extend perpendicular to the web 10 at a distance and parallel to each other. The outer flange 6 and outer flanges 14 of the stringers 12 form a supporting surface, onto which a skin 16 rests. This arrangement is a typical way of creating a fuselage structure 2, e.g. for a cylindrical fuselage of an aircraft with sufficient mechanical stability.

Using an arrangement of two flanges 6 and 8 arranged at a distance to each other and connected through the web 10 leads to a particularly high geometrical moment of inertia. However, in common installations in commercial aircraft, the volume between the outer flange 6 and the inner flange 8 remains substantially unused.

A core of the invention lies in providing a fuel cell unit 18 into an available receiving space 20. In this exemplary embodiment, a fuel cell unit 18 is inserted into the receiving space 20 that is delimited by two adjacent stringers 12 and a clearance between the two flanges 6 and 8. Resultantly, the fuel cell unit 18 comprises the shape of a segment of a ring with two lateral cut-outs 22 that conform the shape of the stringers 12. The thickness of the fuel cell unit 18 is exemplarily limited to a dimension less than the extension d from the web 10 to an outer edge 24 of the inner flange 24. The height of the fuel cell unit 18 is adapted to the clearance dimension h between the outer flange 6 and the inner flange 8.

As explained in the following, at least parts of the fuel cell unit 18 are manufactured using an additive manufacturing method. Exemplarily, the fuel cell unit 18 comprises a first axial surface 26, into which a first output pole 28 and a second output pole 30 are integrated, which provide the generated electrical energy from the respective fuel cell unit 18. Further, a water extraction port 32 is arranged at a bottom region of the fuel cell unit 18 for extracting water that accumulates during the fuel cell process. For example, the water extraction port 32 may be connected to a water extraction duct 34, which runs on an interior side of the skin 16 and may lead to a water collecting device (not shown).

As apparent in FIG. 1, a plurality of fuel cell units 18 may be distributed in the available space 20 of the structural component 4, such that the generated power can be chosen based on the actual demand at that location.

FIG. 2 shows a principle setup of a fuel cell unit 18 in a very schematic illustration for a better understanding of its working principle. Here, a first casing part 36 is shown, which is manufactured using an additive manufacturing method. The first casing part 36 is equipped with a fuel duct 38, which extends from a first lateral side 40 to a second lateral side 42. On this course, a plurality of distributing branches 44 are placed, which connect to the fuel line 38 and comprise a plurality of openings 46. The arrangement of fuel duct 38, branches 44 and openings 46 constitute a fuel distributor 48. In this example, the fuel distributor 48 is arranged at a region of the first casing part 36, which will be close to the inner flange 8 of the structural component 4.

In a region of the first casing part 36, which extends at a substantially right angle to the before mentioned part, an oxidant line 50 extends from the first lateral side 40 to the second lateral side 42. A plurality of branching ducts 52 is coupled with the oxidant duct 50 and comprises a plurality of openings 54. The oxidant duct 50, the branching ducts 52 and the openings 54 constitute an oxidant distributor 56.

The first casing part 36 is capable of receiving a plurality of individual fuel cells 58, which are arranged side by side in the first casing part 36.

Exemplarily, each fuel cell 58 comprises an anode 60, a membrane 62 and a cathode 64. A first bipolar plate 66 is arranged at a side of the anode 60 and is coupled with the fuel distributor 48, i.e. with the openings 46 of one of the branching ducts 44. Fuel, e.g. a hydrogen containing gas or pure hydrogen, reaches the anode 60 through a plurality of conduits 68 in the first bipolar plate 66 and provides the positive pole for the generated electrical energy.

The membrane 62 may be realized as a solid polymer membrane, which is a thin plastic film that is permeable to protons when saturated with water. Through the membrane, a proton exchange is conducted, while electrons can only pass from the anode 60 to the cathode 64 through the electric circuit attached to the respective fuel cell 58.

At a side of the cathode 64, a second bipolar plate 70 is arranged, which is coupled with the oxidant distributor 56 and comprises a series of conduits 72 for leading the oxidant to the cathode 64. Further, water that is created during the fuel cell process accumulates at the cathode 64 and reaches the conduits 72, where it needs to be extracted. An extraction port 32 may be arranged on the fuel cell unit 18 as shown in FIG. 1.

The individual fuel cell 58 is realized with a compact shape that is adapted to the available space inside the first casing part 36. Consequently, it may be feasible to also produce at least the metallic parts of a fuel cell 58 through additive manufacturing methods.

If the available installation space inside a fuel cell unit 18 allows it and in case a certain voltage is required that clearly exceeds a typical PEM voltage of 0.6 V to 0.7 V at full load, a plurality of additional fuel cells 58 is to be arranged in the fuel cell unit 18. The illustration in FIG. 2 is merely schematic and shows for block-type fuel cells 58. However, it may be feasible to provide a rather high number of fuel cells 58 in a single fuel cell unit 18 to reach a required voltage level. Further, it is advantageous to periodically change the orientation of the individual fuel cells 58, such that a single second bipolar plate 70 can be used by two adjacent fuel cells 58. At a lateral end opposite the first bipolar plate 66, a third bipolar plate 74 may be arranged, which may be similar to the first bipolar plate 66, but contacts a cathode 64.

During operation of the fuel cell unit, fuel may enter the fuel duct 38, e.g. at the first lateral side 40 and flows to the second lateral side 42. On this course, fuel is distributed through the openings 46 of the branching ducts 44 to several bipolar plates 66 or 72, depending on the order inside the fuel cell unit 18. It may be feasible to put a plug or stopper into the fuel duct 38 at the second lateral side 42 if the fuel cell unit 18 is a single fuel cell unit 18 at a desired installation space. However, if further fuel cell units 18 are to be placed in an adjacent position, its fuel duct 38 may be connected to the fuel duct 38 of the adjacent fuel cell unit 18. The same applies for the oxidant line 50, which may simply pass from the first lateral side 40 to the second lateral side 42. Here, it may be connected to another oxidant line 50 of an adjacent fuel cell unit 18 or a plug or stopper may be arranged to close off the oxidant line 50.

For increasing the efficiency of using the space available for the fuel cell unit 18, it is feasible to manufacture at least the first casing part 36 with an additive manufacturing method. Hence, the fuel duct 38, the branching duct 44, the oxidant duct 50 as well as the branching ducts 52 are integrated into the first casing part 36 and the course of these may be more elaborate and compact.

For closing off the first casing part 36 to form a closed casing, a second casing part 76 is provided, which is attachable to the first casing part 36.

For providing the cut-outs 22 shown in FIG. 1, either the whole fuel cell unit 18 may be tailored to this available installation space or a further casing or flange may enclose the first and second casing parts 36 and 76 or be attached thereto. As stated above, FIG. 2 is merely schematic and the cut-outs 22 are left out for simplification.

FIG. 3 shows the basic principle of interconnecting two adjacent fuel cell units 18 through connectors 78 and 80, which securely connect the fuel ducts 38 as well as the oxidant ducts 50 of two adjacent fuel cell units 18. At the end of a chain of fuel cell units 18, the respective fuel duct 38 and oxidant duct 50 are to be closed through plugs 82 and 84. While each fuel cell unit 18 may comprise two output poles 28 and 30, these may be connected through a serial connection (not shown). For the sake of an improved reliability, it may also be feasible to route the electrical lines of each fuel cell unit 18 to a certain power electronics unit, which may tolerate a failure of individual fuel cell units 18 without a total voltage having a failure.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for integrating at least one fuel cell unit into the structural component of an aircraft, comprising:
    determining an available receiving space in an interior structural component of the aircraft, that allows receiving a fuel cell unit through insertion from outside the structural component into the receiving space; wherein the aircraft comprises a fuselage having a series of frames arranged at a distance from each other;
    wherein the interior structural component is at least one frame of the series of frames and the at least one frame comprises a first flange and a web;
    providing at least two casing parts that are assembleable to a closed casing;
    providing at least one fuel cell having an anode, a cathode and an electrolyte;
    assembling the casing parts and the at least one fuel cell to form the fuel cell unit; and
    inserting the at least one fuel cell unit into a profile space defined by the first flange and the web,
    wherein at least one of the casing parts is manufactured using an additive manufacturing method such that the fuel cell unit fits into the determined receiving space,
    wherein one of the casing parts comprises an exterior fuel inlet and an interior fuel distributor for leading a fuel from the exterior fuel inlet to at least one fuel outlet couplable with each of the at least one fuel cell, and
    wherein one of the casing parts comprises an exterior oxidant inlet and an interior oxidant distributor for leading an oxidant from the exterior oxidant inlet to at least one oxidant outlet couplable with each of the at least one fuel cell.

2. The method according to claim 1, further comprising providing at least a component of the at least one fuel cell through an additive manufacturing method.

3. The method of claim 1, wherein the at least one casing part comprises at least one fuel duct having an external fuel input and at least one internal fuel output inside a walling of the respective casing part.

4. The method of claim 1, wherein the at least one casing part comprises at least one oxidant duct having an external oxidant input and at least one internal oxidant output inside a walling of the respective casing part.

5. The method of claim 1, further comprising inserting at least a second fuel cell unit into a respective at least one second receiving space of the structural component.

6. The method of claim 5, further comprising electrically connecting at least two of the fuel cell units in a serial connection.

7. The method of claim 5, further comprising connecting the external fuel inlet of one of the fuel cell units to an external fuel outlet of another one of the fuel cell units, which fuel outlet is coupled with the fuel duct of the respective one of the fuel cell units.

8. The method of claim 5, further comprising connecting the external oxidant inlet of one of the fuel cell units to an external oxidant outlet of another one of the fuel cell units, which oxidant outlet is coupled with the oxidant duct of the respective one of the fuel cell units.

9. An aircraft, comprising:
a fuselage having a series of frames arranged at a distance to each other,
at least one fuel cell system having at least one fuel cell unit comprising:
at least one fuel cell having an anode, a cathode and an electrolyte,
a closed fuel cell unit casing having at least two casing parts, wherein one of the casing parts comprises an exterior fuel inlet and an interior fuel distributor for leading a fuel from the exterior fuel inlet to at least one fuel outlet couplable with each of the at least one fuel cell, and wherein one of the casing parts comprises an exterior oxidant inlet and an interior oxidant distributor for leading an oxidant from the exterior oxidant inlet to at least one oxidant outlet couplable with each of the at least one fuel cell,
wherein at least one of the casing parts is manufactured using an additive manufacturing method such that the fuel cell unit fits into a receiving space of a structural component of a vehicle,
wherein at least one frame of the series of frames comprises a first flange and a web connected to the first flange,
wherein at least one fuel cell unit of the at least one fuel cell system is arranged in a profile space defined by the first flange and the web.

10. The aircraft of claim 9, wherein the at least one frame comprises a second flange connected to the web, wherein the profile space for integration of the at least one fuel cell is defined between the first flange, the second flange and the web.

11. The aircraft of claim 9, wherein a plurality of fuel cell units are arranged in at least one frame of the series of frames, wherein the plurality of fuel cell units are electrically connected to each other in a series connection.

* * * * *